Dec. 2, 1930.  F. J. LAHER  1,783,335

AUTOMOBILE BUMPER

Filed May 10, 1926

INVENTOR
Frank J. Laher.
BY White First
his ATTORNEYS

Patented Dec. 2, 1930

1,783,335

UNITED STATES PATENT OFFICE

FRANK J. LAHER, OF OAKLAND, CALIFORNIA

AUTOMOBILE BUMPER

Application filed May 10, 1926. Serial No. 107,845.

This invention relates generally to devices to be used on automobiles or other vehicles for absorbing impacts.

In the past, automobile bumpers have been constructed of spring impact bars supported on the automobiles in such a manner as to permit a certain amount of "give" in resisting impacts. This "give" has usually been obtained by spring bars which supported or reinforced the impact bars so as to resist impact forces by bending stresses. Such arrangements necessarily involved the use of a number of expensive parts and much labor was required in shaping the spring bars. Because the many clamps and bolted connections required were difficult to keep tight, these bumpers have also been the source of objectionable rattles. Furthermore, severe impacts were apt to exceed the elastic limit of the spring bars with the result that they were either permanently deformed or broken.

It is an object of this invention to simplify and improve the construction of automobile bumpers by employing rubber as a means for cushioning the impact bars.

It is a further object of this invention to devise a bumper of unusual strength in which it will be practically impossible to injure the cushioning means by severe impacts.

Further objects of this invention will appear from the following description in which I have set forth the preferred embodiment of my invention. It is to be understood that the scope of this invention is to be determined from the appended claims and the state of the prior art.

Referring to the drawings.

The principles of this invention may be applied to any of the standard types of automobile bumpers which employ an impact member in the form of one or more horizontal bars operatively positioned upon a vehicle by means of one or more support members. It is proposed to employ a resilient rubber cushion preferably in the form of a deformable block which is incorporated with the mounting of the impact member so as to permit a certain amount of "give" to the impact member with respect to its support member.

Figure 1:
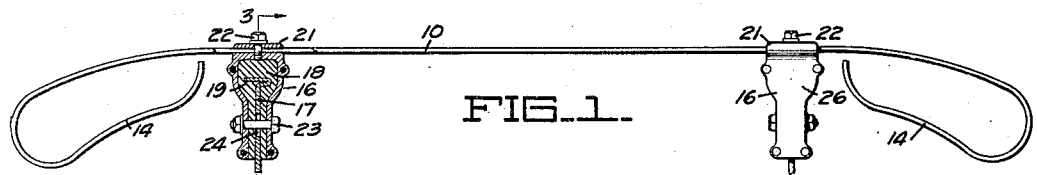
Figure 1 is a plan view of one form of bumper incorporating the principles of this invention.
Figure 2:
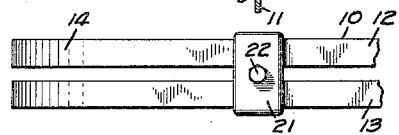
Fig. 2 is a front view of a portion of the bumper shown in Fig. 1.
Figure 3:
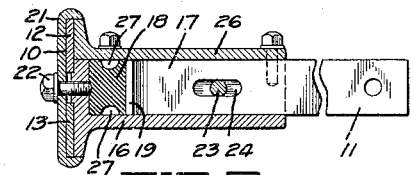
Fig. 3 is a cross sectional view taken along the line 3—3 of Fig. 1.

Thus, referring to Figs. 1 and 2, there is shown a simple form of bumper comprising an impact member 10 which is operatively positioned upon an automobile by means of the support bars 11 which in turn are suitably mounted upon the chassis of an automobile. The impact member 10 is shown as comprising a plurality of horizontal bars 12 and 13 having inturned or looped ends 14. Secured at spaced points along the impact member are the hollow members 16 within which the projecting ends 17 of the support bars are adapted to fit. Inserted between the end of each of the support bars 11 and the inner end of its associated hollow member 16 there is a rubber cushion 18 which also preferably extends between the sides of the support bar and the inner side walls of the hollow member 16, as shown in Fig. 1. By rubber the applicant has reference to latex compositions having high elasticity and tensile strength. The most common composition of this kind is ordinary vulcanized rubber which may be suitably reinforced if desired by the use of vegetable fiber. In order to provide more bearing surface for the support bar 11 the inner end of this bar is preferably turned over at 19 to afford a relatively large bearing surface. Both of the hollow members 16 are secured to the impact bars 12 and 13 by suitable means such as clamping plates 21 and cap screws 22 whereby the impact bars are maintained in spaced vertical relationship. In order to limit movement of the hollow member 16 with respect to the support bar 11 there may be provided a pin or bolt 23 extending thru the hollow member 16 and thru a slot 24 in the support bar 11. For convenience in assembling, the top plate 26 may be made separable from the hollow member 16, as shown in Fig. 3.

With a bumper of the type described above the impact bars 10 may be made relatively rigid as the rubber cushion may be relied upon to supply the requisite "give" to the bumper. When an impact force is received by the impact bars the hollow member 16 will be forced inwardly with respect to the support bars 11 with the result that the rubber inserted between the ends of the hollow member bars 11 and the inner ends of the hollow member 16 will be deformed to resiliently resist the force of the impact. In order to add more resilience to this rubber cushion spaces 27 may be provided into which the rubber may deform. Since it is proposed to insert the rubber with a fairly tight fit into the hollow member 16, rattling of the interfitting parts is reduced to a minimum. Instead of inserting the rubber into the hollow member 16, it may be vulcanized directly in place with respect to the support bar.

Figure 5:
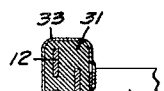
Fig. 5 is a cross sectional view taken along the line 5—5 of Fig. 4.
Figure 4:
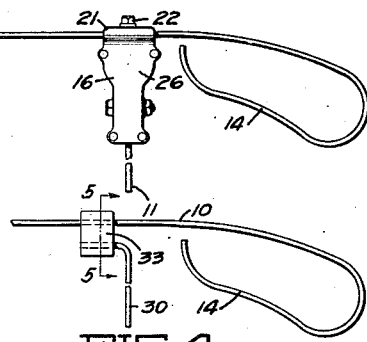
Fig. 4 is a plan view of a portion of a bumper showing a modified form of mounting for the impact member.

In the construction shown in Figs. 4 and 5 the impact bars have been shown as secured to each of the support bars 30 by means of a single block of rubber 31. This rubber block may be vulcanized in place so as to retain the impact bars 12 and 13 in spaced relationship with respect to each other and the support bar 30. In order to protect the outer surface of the rubber block a metal band 33 may be positioned about its periphery. With this construction there is no chance for any rattling to occur and the impact member may give a certain amount in any direction.

Figure 6:
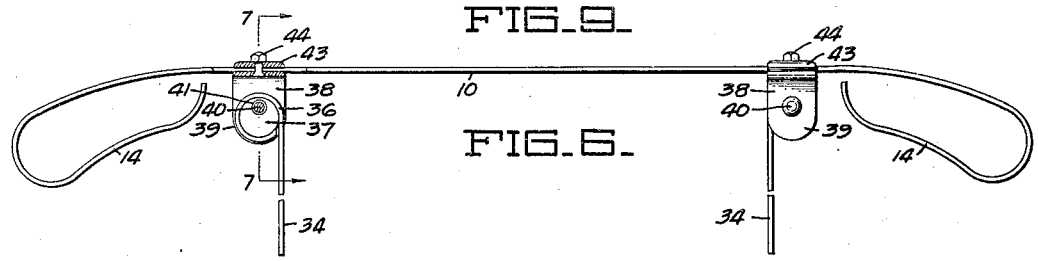
Fig. 6 is a plan view of the bumper similar to Fig. 1 but with another form of mounting.

In the bumper shown in Fig. 6 the rubber cushion has been incorporated in a more convenient form so that it can be more readily assembled with the bumper. In this case each of the support bars 34 is provided with a ring or eye 36 formed upon its outer end which is adapted to engage the periphery of a rubber block 37. Preferably the rubber block 37 is forced under pressure into the retaining eye 36 so that it will be frictionally retained therein. Secured to the impact member in position to engage each of the support bars 34 there is a yoke 38 having spaced branches 39 adapted to extend upon the upper and lower sides of the eye 36. Extending thru the two branches 39 and thru the rubber block 37 there is a pin or bolt 40 which is adapted to deform the rubber block 37 when moved with respect to the support bars. A metal liner 41 is preferably inserted in the aperture in the rubber block 37 in order to engage the bolt 40 and to increase the bearing surface on the rubber.

Figure 7:
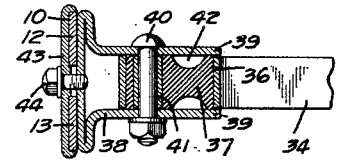
Fig. 7 is a cross sectional view taken along the line 7—7 of Fig. 6.

In order to provide as much resilience as possible, with a given size of rubber block, the liner 41 and the aperture in the rubber block are preferably placed eccentric to the center thereof, as shown in Figs. 6 and 7, so that the greater portion of the mass of rubber will lie between the bolt 40 and the inner side of the retaining eye 36. Recesses 42 may also be provided in the rubber block for providing space into which the rubber may expand. The yoke 38 may be secured to the impact member by suitable means such as clamping plate 43 secured in position by a screw 44 whereby the impact bars 12 and 13 are retained in spaced vertical relationship. With this construction the impact bars are permitted to give in resisting both front and side impacts.

Figure 9:
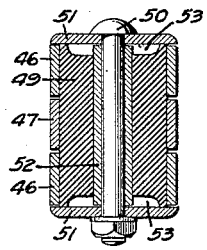
Fig. 9 is a cross sectional view taken along the line 9—9 of Fig. 8.
Figure 8:
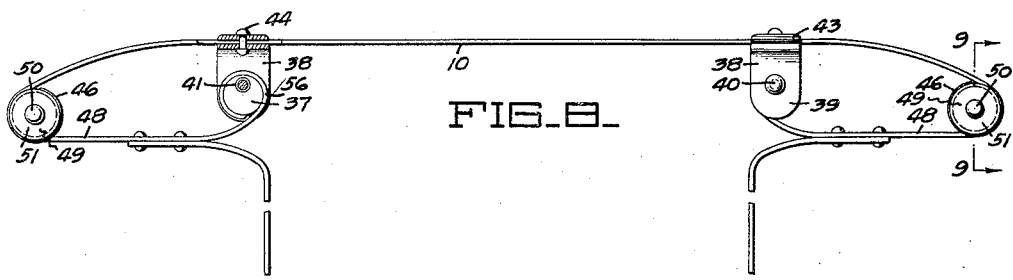
Fig. 8 is a plan view of another form of bumper showing the use of rubber for mounting the impact member.
Figure 10:
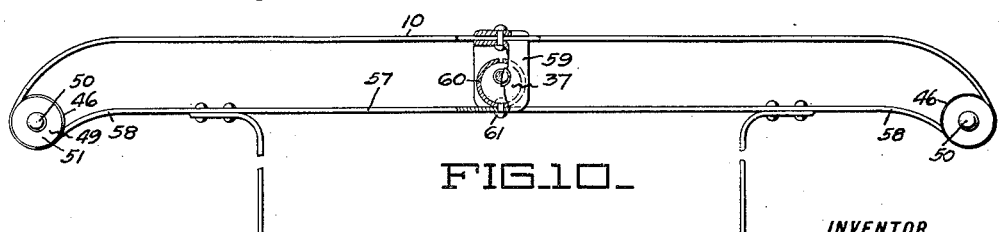
Fig. 10 is a plan view of a bumper showing a modification of the construction shown in Fig. 8.

With the modifications shown in Figs. 8 to 10 inclusive the idea of employing the rubber cushioning means has been extended to a bumper having open looped ends. Thus in the construction shown in Fig. 8, the impact bars are shown as provided with enlarged eyes or rings 46 formed adjacent their ends, which are adapted to register with eyes 47 formed on the ends of support bars 48. Instead of providing a single metallic pin for interconnecting the eyes 46 and 47 and as with the ordinary type of bumper, there is provided a rubber bushing 49 which is forced under pressure into the registering eyes to form a pivotal and resilient connection therefor. For reinforcing and for retaining this bushing in position, a pin or bolt 50 is provided which extends thru the bushing 49 and serves to clamp washers 51 against the upper and lower edges of the eyes 46. The bearing surface of the pin 50 upon the rubber bushing may be enlarged by providing a metal liner 52, the ends of which preferably extend into abutting engagement with the washers 51. This bushing may also be provided with recesses 53 for adding to the resilience of the rubber block.

With this construction the give between the impact and support members is supplied by relative movement between the eyes 46 and 47 which deforms the rubber bushing 49. Since the bushing has a pressed fit with the eyes there will be no tendency for this connection to rattle. In order to reinforce the intermediate portion of the impact member 10 the support bars 48 have been shown as provided with a retaining ring or eye 56 engaging a rubber cushioning block 37 of the same construction as that shown in Fig. 7. With this form of bumper each side of the impact member is resiliently mounted at two spaced points to the support bar 38. The impact bar 10 may be made substantially rigid as it need not flex in order to give with respect to the bumper support. Furthermore, when an impact force is received near one end of the impact member a substantial amount of give will be permitted which need not be taken up by resilience in support bar 48.

The construction shown in Fig. 10 is somewhat similar to that shown in Fig. 8 but differs in that a resilient connection has been shown for reinforcing the central portion of the impact member. In this case the support member has been shown as incorporating a single bar 57 extending to the rear of the impact member 10 and provided with rearwardly turned ends 58 provided with eyes 46, as in the construction shown in Fig. 8. The end connections for the support bar 57 and the impact member are similar to that described for the bumper shown in Fig. 8. The central portion of the impact member 10 is reinforced by a resilient connection 59 which is inserted between the impact member and the support bar 57. This resilient connection is similar to that described in connection with Figs. 6 and 7 with the exception that the engaging ring 60 is secured directly to the support bar 57 by suitable means such as a rivet or screw 61. The operation of this bumper is similar to that described in connection with Fig. 8.

I claim:

1. An automobile bumper comprising an impact member secured adjacent its ends to a support member so as to form substantially open looped ends, and a rubber block at each end of the impact member forming means for securing said members together.

2. An automobile bumper comprising an impact member having eyelets adjacent its ends, a support member having eyelets adapted to register with said first named eyelets and a piece of rubber extending thru said eyelets.

3. A vehicle bumper comprising impact and support members, a rubber block for cushioning said members, and means for securing said block to the bumper comprising means secured to one of said members and encompassing said block, and means secured to the other of said members and projecting into the interior of said block.

4. A vehicle bumper comprising impact and support members, a rubber block for cushioning said members, and means for securing said block to the bumper comprising an eyelet surrounding said block and secured to one of said members, and a pin projecting into the interior of the block and secured to the other of said members.

5. A vehicle bumper comprising impact and support members, a rubber block for cushioning said members, and means for securing said block to the bumper comprising an eyelet surrounding said block and secured to one of said members, and a pin extending through said block and secured to the other of said members.

In testimony whereof, I have hereunto set my hand.

FRANK J. LAHER.